(12) United States Patent
Kailani et al.

(10) Patent No.: US 8,182,571 B2
(45) Date of Patent: May 22, 2012

(54) FRAME FOR RECEIVING A FILTER ELEMENT AND METHOD FOR PROVIDING

(75) Inventors: Ammar Kailani, Richardson, TX (US); Russell Lewis Baldinger, Laurelville, OH (US)

(73) Assignee: Lennox Industries Inc., Richardson, TX (US)

( * ) Notice: Subject to any disclaimer, the term of this patent is extended or adjusted under 35 U.S.C. 154(b) by 414 days.

(21) Appl. No.: 11/954,207

(22) Filed: Dec. 11, 2007

(65) Prior Publication Data

US 2009/0145060 A1   Jun. 11, 2009

(51) Int. Cl.
*B01D 46/00* (2006.01)

(52) U.S. Cl. .......... 55/511; 55/496; 55/497; 55/DIG. 31

(58) Field of Classification Search ............... 55/497, 55/511, DIG. 31, 495, 496, 521
See application file for complete search history.

(56) References Cited

U.S. PATENT DOCUMENTS

| | | | | |
|---|---|---|---|---|
| 2,393,419 A * | 1/1946 | Schaaf | ............ | 52/658 |
| 2,405,293 A * | 8/1946 | Dahlman | ............ | 55/529 |
| 2,405,716 A * | 8/1946 | Schaaf | ............ | 55/489 |
| 2,639,003 A * | 5/1953 | Russell | ............ | 29/446 |
| 2,723,731 A * | 11/1955 | Schaaf | ............ | 52/658 |
| 2,869,694 A * | 1/1959 | Breckheimer | ............ | 52/658 |
| 4,479,737 A * | 10/1984 | Bergh et al. | ............ | 403/382 |
| 4,584,005 A * | 4/1986 | Allan et al. | ............ | 55/499 |
| 4,600,419 A * | 7/1986 | Mattison | ............ | 55/484 |
| 4,607,576 A * | 8/1986 | Kranjec | ............ | 108/110 |
| 4,885,015 A | 12/1989 | Goulet et al. | | |
| 4,963,171 A * | 10/1990 | Osendorf | ............ | 55/355 |
| 5,273,563 A | 12/1993 | Pasch et al. | | |
| 5,273,564 A | 12/1993 | Hill | | |
| 5,599,448 A | 2/1997 | Spearman | | |
| 5,743,927 A | 4/1998 | Osendorf | | |
| 5,840,094 A | 11/1998 | Osendorf et al. | | |
| 6,319,300 B1 * | 11/2001 | Chen | ............ | 55/497 |
| 6,464,745 B2 * | 10/2002 | Rivera et al. | ............ | 55/497 |
| 6,592,643 B2 | 7/2003 | Shah et al. | | |
| 6,652,613 B2 | 11/2003 | Shah et al. | | |
| 6,723,150 B2 | 4/2004 | Parker | | |
| 6,814,773 B2 | 11/2004 | Shah et al. | | |
| 7,037,354 B1 | 5/2006 | Dimicelli | | |
| 7,169,202 B2 | 1/2007 | Kubokawa | | |
| 2004/0182055 A1 | 9/2004 | Wynn | | |
| 2006/0201120 A1 | 9/2006 | Wu et al. | | |
| 2008/0184685 A1 * | 8/2008 | Kempf et al. | ............ | 55/497 |

* cited by examiner

*Primary Examiner* — Robert Clemente

(57) ABSTRACT

A frame for receiving a filter element includes: a pair of first members and a pair of second members. The first members may be arranged alternately with the second members in the assembled orientation to establish a plurality of joining structures between adjoining members. Each respective joining structure of the plurality of joining structures maintains the adjoining members oriented substantially about a respective axis. The first members and the second members cooperate to define a volume for effecting the receiving.

4 Claims, 8 Drawing Sheets

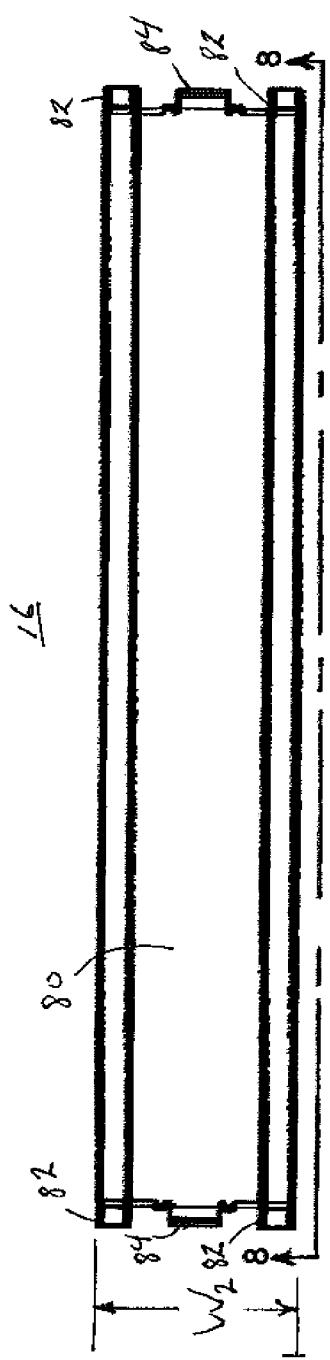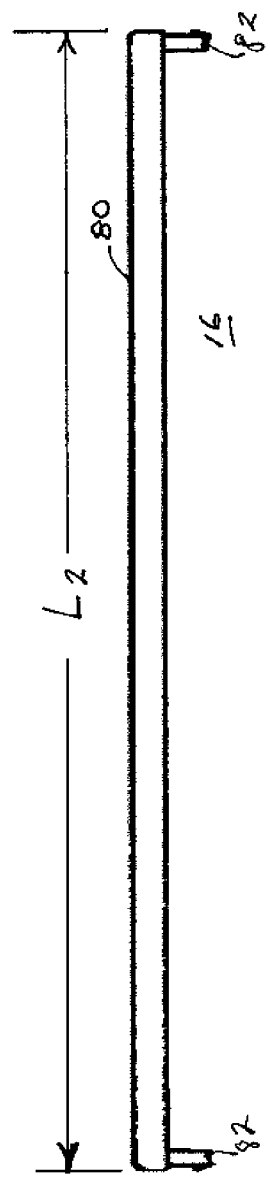
FIG. 7
FIG. 8

FRAME FOR RECEIVING A FILTER ELEMENT AND METHOD FOR PROVIDING

BACKGROUND OF THE INVENTION

The present invention is directed to frames for receiving filter elements, and especially to frames for receiving air filter elements for use in heating, ventilating and air conditioning (HVAC) systems.

HVAC systems may include or employ filter elements for removing particles or other elements from air circulated within the system in order to provide cleaner air for spaces serviced by the system. The air filter elements may be supported in predetermined positions within an air duct or similar locus in the HVAC system. The filter elements may require removal for replacement or cleaning. It is preferred that replacement filters with associated frames for supporting the elements in a duct or other locus in an HVAC system may occupy little storage space and present a compact package for shipping to storing sites or to users.

There is a need for a frame for supporting a filter element that may be configured to be collapsible yet may provide substantially strong support for a filter element in when in an assembled orientation and employed for receiving a filter element.

SUMMARY OF THE INVENTION

A frame for receiving a filter element includes: a pair of first members and a pair of second members. The first members may be arranged alternately with the second members in the assembled orientation to establish a plurality of joining structures between adjoining members. Each respective joining structure of the plurality of joining structures maintains the adjoining members oriented substantially about a respective axis. The first members and the second members cooperate to define a volume for effecting the receiving.

A method for providing a frame for receiving a filter element includes: (a) in no particular order: (1) providing a pair of first members; and (2) providing a pair of second members; and (b) arranging the first members alternately with the second members in an assembled orientation to establish a plurality of joining structures between adjoining members. Each respective joining structure of the plurality of joining structures maintains the adjoining members oriented substantially about a respective axis. The first members and the second members cooperate to define a volume for effecting the receiving.

It is, therefore, a feature of embodiments of the present invention to provide a frame for supporting a filter element that may be configured to be collapsible yet may provide substantially strong support for a filter element in when in an assembled orientation and employed for receiving a filter element.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 7 is a top plan view of a second member of the frame illustrated in FIG. 1.

FIG. 8 is a side view of the second member, viewed along section line 8-8 in FIG.

DETAILED DESCRIPTION OF THE PREFERRED EMBODIMENT

Figure 1:
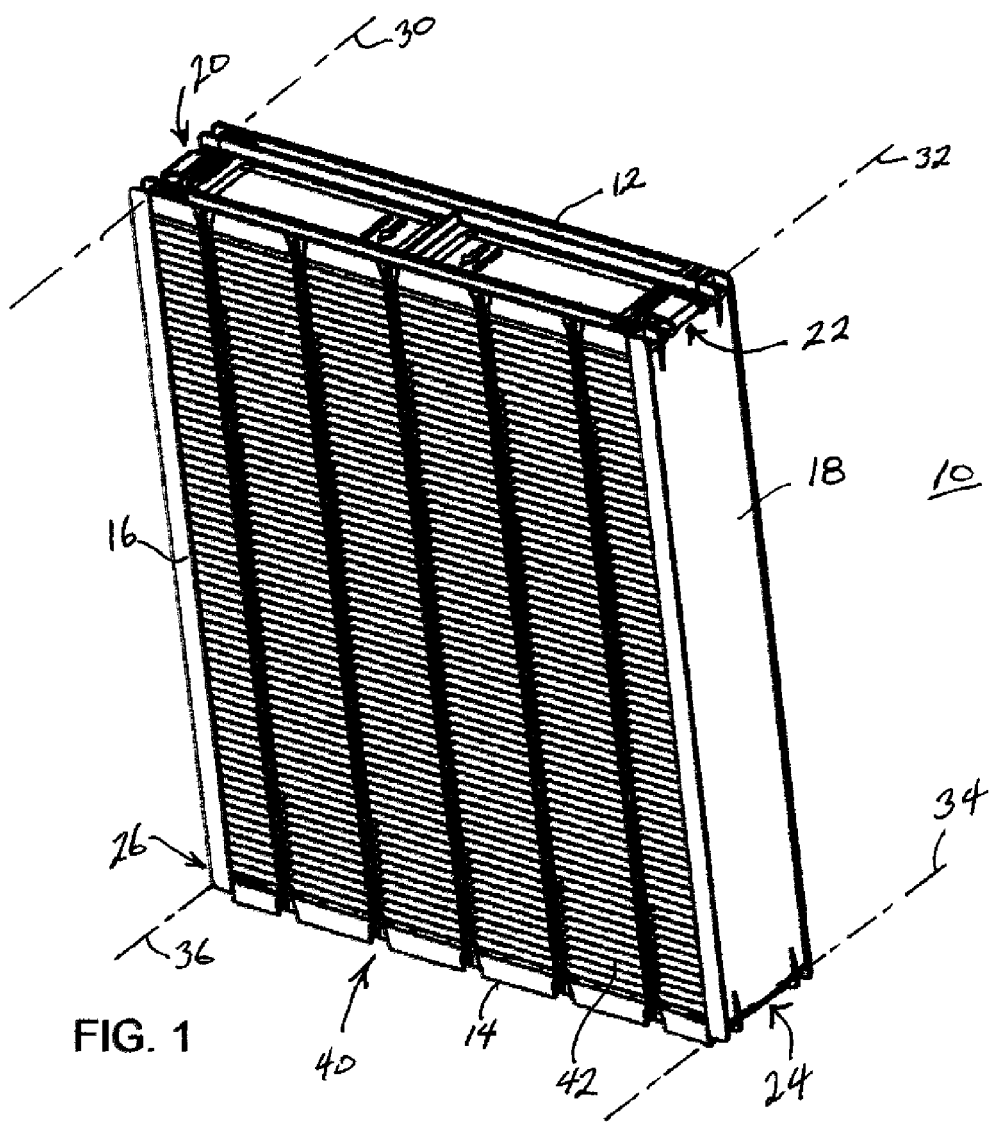
FIG. 1 is a perspective view of an assembled frame apparatus with a received filter element.

FIG. 1 is a perspective view of an assembled frame apparatus with a received filter element. In FIG. 1, a frame apparatus 10 includes a pair of first members 12, 14 arranged alternately with a pair of second members 16, 18 to establish a plurality of joining structures 20, 22, 24, 26. Joining structure 26 is not clearly visible in FIG. 1. Preferably, joining structure 26 is substantially similar to joining structures 20, 22, 24. Joining structure 20 maintains adjoining members 12, 16 oriented substantially about a linear axis 30. Joining structure 22 maintains adjoining members 12, 18 oriented substantially about a linear axis 32. Joining structure 24 maintains adjoining members 14, 18 oriented substantially about a linear axis 34. Joining structure 26 maintains adjoining members 14, 16 oriented substantially about a linear axis 36.

In the assembled orientation illustrated in FIG. 1, members 12, 14, 16, 18 cooperated through joining structures 20, 22, 24, 26 to define a volume 40 for receiving a filter element 42.

Figure 2:
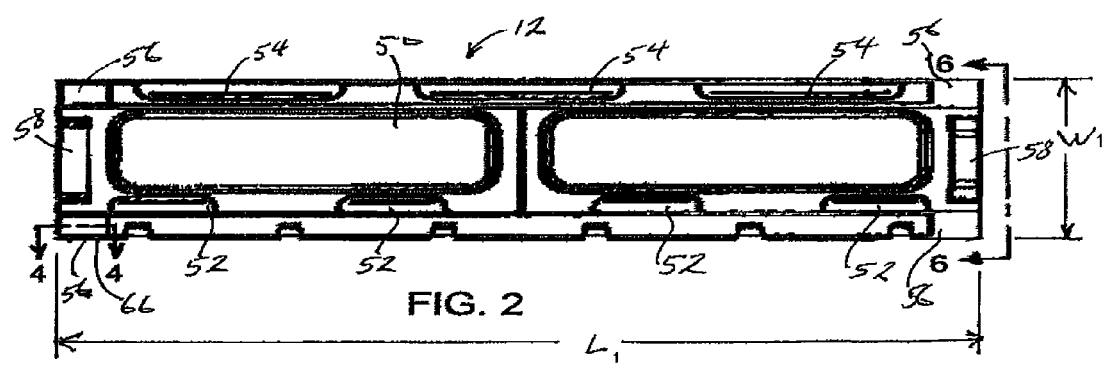
FIG. 2 is a top plan view of a first member of the frame illustrated in FIG. 1.
Figure 3:
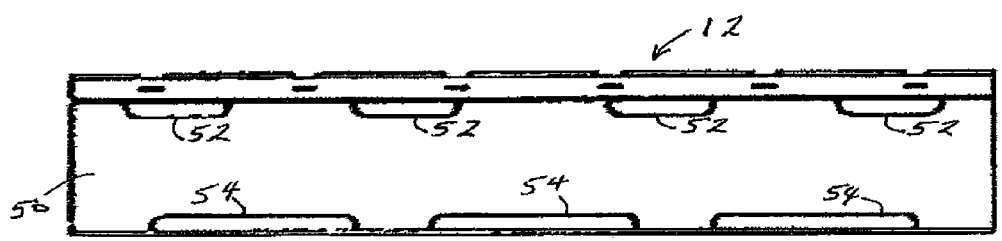
FIG. 3 is a bottom plan view of the first member illustrated in FIG. 2.

FIG. 2 is a top plan view of a first member of the frame illustrated in FIG. 1. FIG. 3 is a bottom plan view of the first member illustrated in FIG. 2. Regarding FIGS. 2 and 3 together, first frame member 12 includes a substantially planar base portion 50 supporting spaced tab members 52, 54. First frame member 12 has a length $L_1$ and a width $W_1$. Length $L_1$ is greater than width $W_1$.

Spaced tab members 52, 54 present a space between themselves and base portion 50 (not specifically illustrated) to permit a sliding installation of a planar base member for filter element 42 to removable affix filter element 42 with respect to first member 12 generally against base portion 50. This installation of filter member 42 with first member 12 is illustrated in greater detail in FIG. 5.

First member 12 also includes receiver structures 56. Preferably one receiver structure 56 is situated at each corner of first member 12. Receiver structures 56 are joining elements that may participate in establishing joining structures 20, 22, 24, 26, as will be described in greater detail below.

First member 12 also includes stop structures 58. Preferably one stop structure 58 is situated at each end of first member 12 on the top side of base portion 50 (visible in FIG. 2). Stop structures 58 are joining elements that may also participate in establishing joining structures 20, 22, 24, 26, as will be described in greater detail below.

First frame member 14 may be substantially similar to first frame member 12. In order to avoid prolixity, a repetitive description of first frame member 14 will not be presented.

Figure 4:
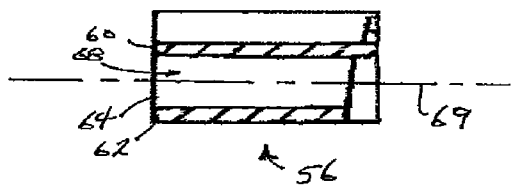
FIG. 4 illustrates details of the first member, viewed along section line 4-4 in FIG. 1.

FIG. 4 illustrates details of the first member, viewed along section line 4-4 in FIG. 2. In FIG. 4, a receiver structure 56 includes an upper wall 60, a lower wall 62, a rear wall 66 and a front wall 66 (not visible in FIG. 4, see FIG. 2). Walls 60, 62, 64, 66 define a channel 68. Channel 68 is oriented substantially symmetrically about an axis 69.

Figure 5:
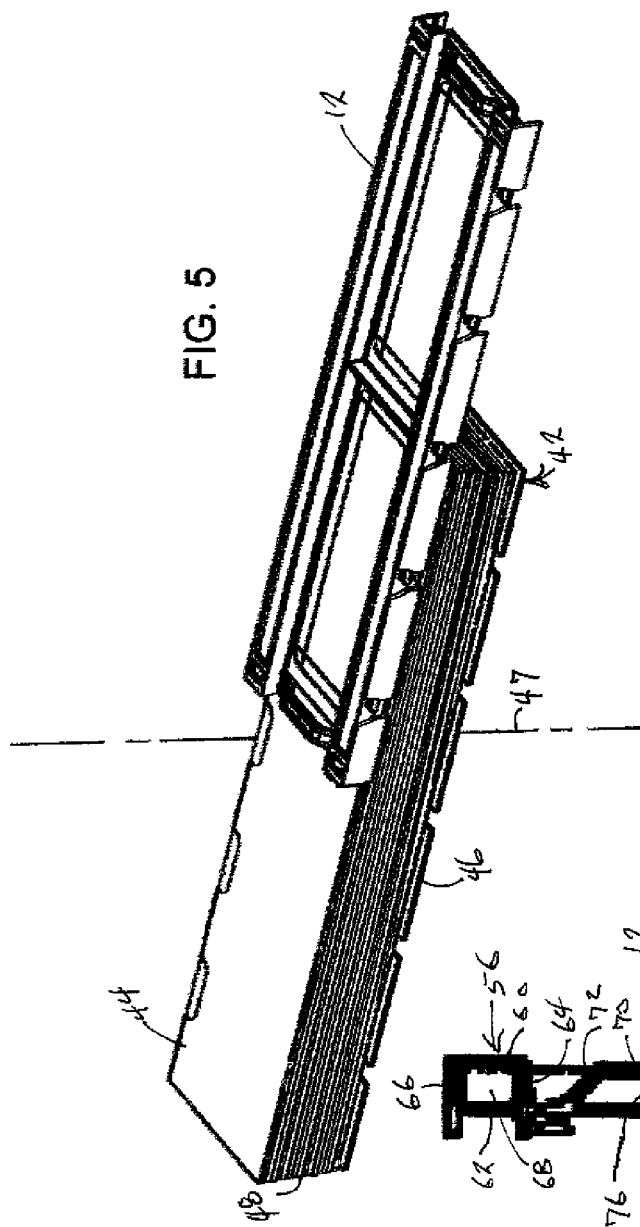
FIG. 5 is a perspective view of the first member being assembled with a filter element.

FIG. 5 is a perspective view of the first member being assembled with a filter element. In FIG. 5, filter element 42 is illustrated in the process of sliding engagement with first member 12. Filter element 42 includes an air-permeable portion 48 coupled with substantially inflexible end portions 44, 46. End portion 44 has a thickness appropriate for sliding between base portion 50 and spaced tab members 52, 54 (see FIG. 2) to establish a slidably removable joining between first member 12 and end portion 44. End portion 46 is similarly proportioned to permit similar sliding removable joining with another end portion 12 (not shown in FIG. 5). Air-permeable portion 48 may be compressible along an axis 47 substantially perpendicular with end portions 44, 46 to permit orienting filter element 42 in a smaller volume. Such a smaller volume is amenable to shipping filter element 42 in a reduced volume package.

Figure 6:
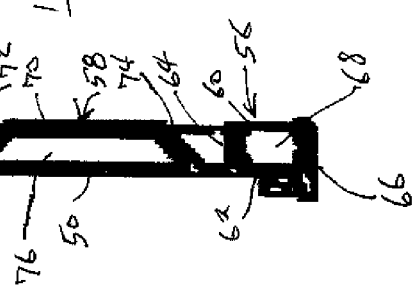
FIG. 6 is an end view of the first member, viewed along section line 6-6 in FIG. 1.

FIG. 6 is an end view of the first member, viewed along section line 6-6 in FIG. 2. In FIG. 6, a first member 12 in end view presents two receiver structures 56 on either corner of first member 12, and a stop structure 58 generally midway between receiver structures 56. Each receiver structure 56 includes an upper wall 60, a lower wall 62, a rear wall 64 and a front wall 66 establishing a channel 68. Stop structure 58 includes a top wall 70 supported in spaced relation from base portion 50 of first member 12 by side walls 72, 74. A channel 76 is established by base portion 50 in cooperation with side walls 72, 74 and top wall 70. Channel 76 may be trapezoidal, as illustrated in FIG. 6. Alternatively, channel 76 may have another quadrilateral shape, a trilateral shape or another polygonal shape appropriate for receiving an inserted member.

Figure 9:
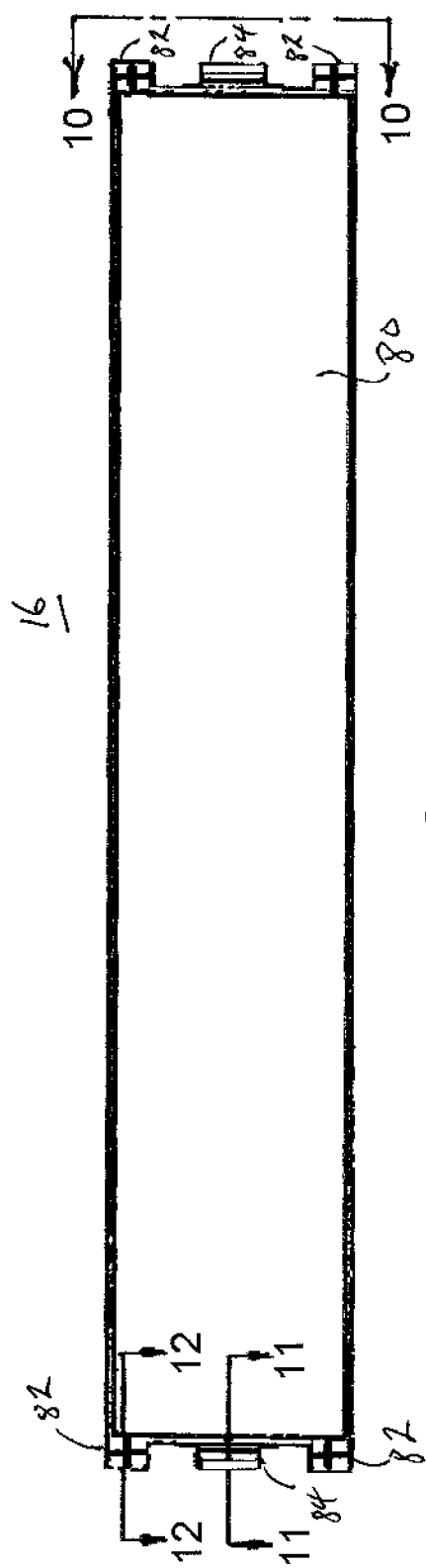
FIG. 9 is a bottom plan view of the second member illustrated in FIG. 7.

FIG. 7 is a top plan view of a second member of the frame illustrated in FIG. 1. FIG. 8 is a side view of the second member, viewed along section line 8-8 in FIG. 7. FIG. 9 is a bottom plan view of the second member illustrated in FIG. 7. Regarding FIGS. 7-9 together, second frame member 16 includes a substantially planar base portion 80. Second frame member 16 has a length $L_2$ and a width $W_2$. Length $L_2$ is greater than width $W_2$.

Second member 16 also includes insertion structures 82. Preferably, one insertion structure 82 is situated at each corner of second member 16. Second member 16 further includes latching insertion structures 84. Preferably, one latching insertion structure 84 is situated at each end of second member 16 between respective insertion structures 82.

Insertion structures 82 are joining elements that may participate in establishing joining structures 20, 22, 24, 26 in cooperation with receiver structures 56 (FIGS. 2, 4 and 6). Each respective insertion structure 82 at a corner of a second member 16, 18 may be inserted within a respective receiver structure 56 at a corner of a first member 12, 14 to participate in establishing a respective joining structure 20, 22, 24, 26.

Latching insertion structures 84 are also joining elements that may participate in establishing joining structures 20, 22, 24, 26 in cooperation with stop structures 58. Each respective latching insertion structure 84 at an end of a second member 16, 18 may be latchingly inserted within a respective channel 76 of a stop structure 58 at an end of a first member 12, 14 to participate in establishing a respective joining structure 20, 22, 24, 26. Latching insertion will be described in greater detail in connection with FIGS. 13-15.

Second frame member 18 may be substantially similar to second frame member 16. In order to avoid prolixity, a repetitive description of second frame member 18 will not be presented.

One skilled in the art of collapsible filter frame manufacture may recognize that receiver structures 56, stop structures 58, insertion structures 82 and latching insertion structures 84 may be placed on any of first members 12, 14 and second members 16, 18 so long as each respective joining structure 20, 22, 24,26 has at least one insertion joining arrangement and a latching joining arrangement. Each insertion joining arrangement includes a mating pair of a receiver structure 56 with an insertion structure 82. Each latching joining arrangement includes a mating pair of a stop structure 58 with a latching insertion member 84. It is preferred that each joining structure include two insertion joining arrangements and a latching joining arrangement.

Figure 10:
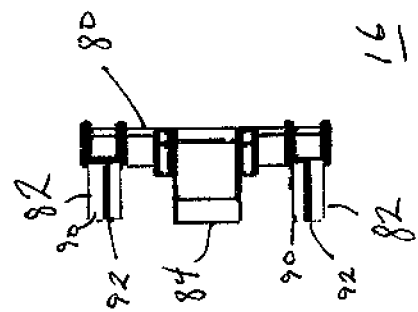
FIG. 10 is an end view of the second member illustrated in FIGS. 7-9, viewed along section line 10-10 in FIG. 9.

FIG. 10 is an end view of the second member illustrated in FIGS. 7-9, viewed along section line 10-10 in FIG. 9. In FIG. 10, a second member 16 presents insertion structures 82 extending from base portion 80 at corners of second member 16, and presents a latching insertion structure 84 from base portion 80 between insertion structures 82. Each insertion structure 82 presents crossed beams 90, 92 arranged generally perpendicular to each other to result in a "+" cross-section (viewed from the left side of FIG. 10) for insertion within a receiver structure 56 (FIGS. 2, 4 and 6) to participate in establishing an insertion joining arrangement for inclusion in a joining structure 20, 22, 24, 26 (FIG. 1). Insertion structure 82 may present any cross-section, such as the "+" cross-section illustrated In FIG. 10, for insertion within receiver structure 56 so long as the fit between insertion structure 82 and receiver structure 56 is snug enough to provide a sturdy and solid insertion joining arrangement for inclusion in a joining structure 20, 22, 24, 26. It is desirable that the fit between insertion structure 82 and receiver structure 56 be amenable to separation by a user tugging insertion structure 82 and receiver structure 56 apart. Other cross-sections may be usable for insertion structure 82 such as, by way of example and not by way of limitation, a quadrilateral cross section, a triangular cross section, a hexagonal cross-section or another cross-section.

Figure 11:
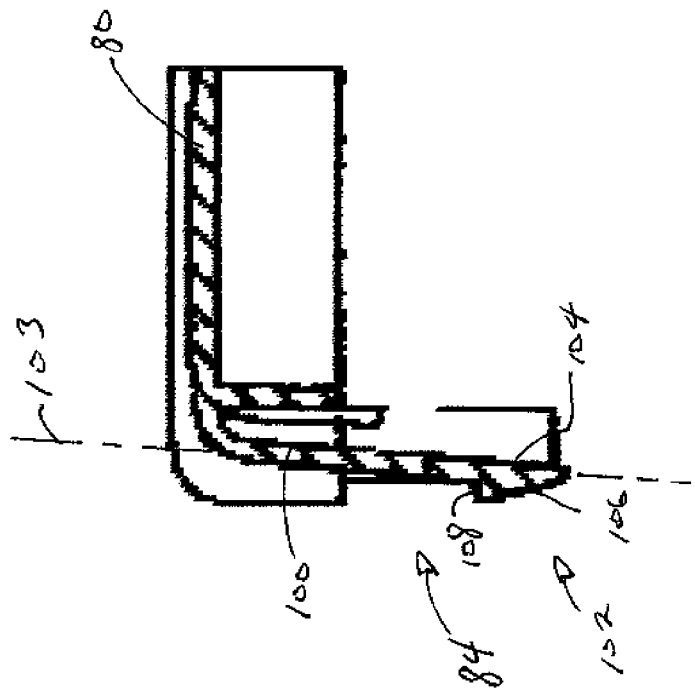
FIG. 11 is a section view of a latching insertion structure, viewed along section line 11-11 in FIG. 9.

FIG. 11 is a section view of a latching insertion structure, viewed along section line 11-11 in FIG. 9. In FIG. 1, a latching insertion structure 84 depends from base portion 80. Latching insertion structure 84 includes a lever portion 100 attached with base portion 80 and a latching portion 102 attached with lever portion 100 distal from base portion 80. Latching portion 102 includes a flat section 104 generally configured in register with a contiguous portion of lever portion 100, a ramp section 106 departs from flat section 104 at an acute angle toward the general direction of base portion 80. A blocking section 108 extends substantially perpendicularly from lever portion 100 to ramp section 106 at a locus displaced from the intersection of flat section 104 and ramp section 106. When at rest, lever portion 100 and latching portion 102 are oriented generally symmetrically about an initial axis 103.

Figure 12:
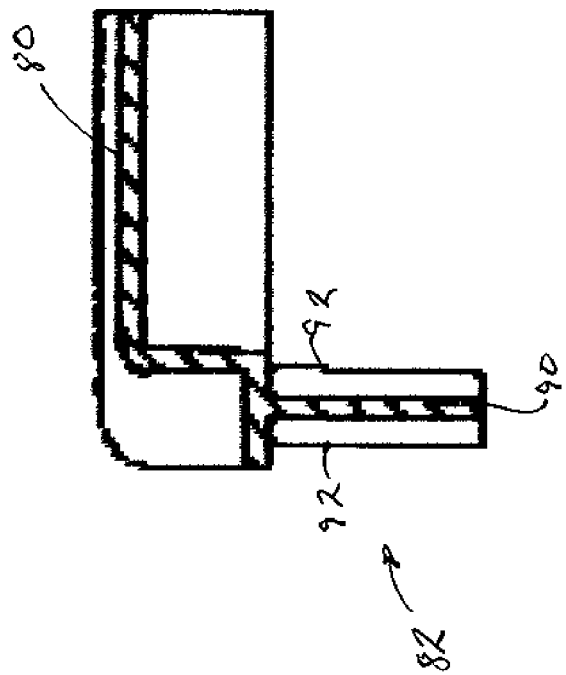
FIG. 12 is a section view of an insertion structure, viewed along section line 12-12 in FIG. 9.

FIG. 12 is a section view of an insertion structure, viewed along section line 12-12 in FIG. 9, an insertion structure 82 depends from base portion 80. Insertion structure 82 includes crossed beams 90, 92 arranged generally perpendicular to each other to result in a "+" cross-section (as viewed from the bottom of FIG. 12) for insertion within a receiver structure 56 (FIGS. 2, 4 and 6) to participate in establishing an insertion joining arrangement for inclusion in a joining structure 20, 22, 24, 26 (FIG. 1). Insertion structure 82 may present any structure for insertion within receiver structure 56 so long as the fit between insertion structure 82 and receiver structure 56 is snug enough to provide a sturdy and solid joining structure 20, 22, 24,26. It is desirable that the fit between insertion structure 82 and receiver structure 56 be amenable to separation by a user tugging insertion structure 82 and receiver structure 56 apart. Other cross-sections may be usable for insertion structure 82 such as, by way of example and not by way of limitation, a quadrilateral cross section, a triangular cross section, a hexagonal cross-section or another cross-section.

Figure 13:
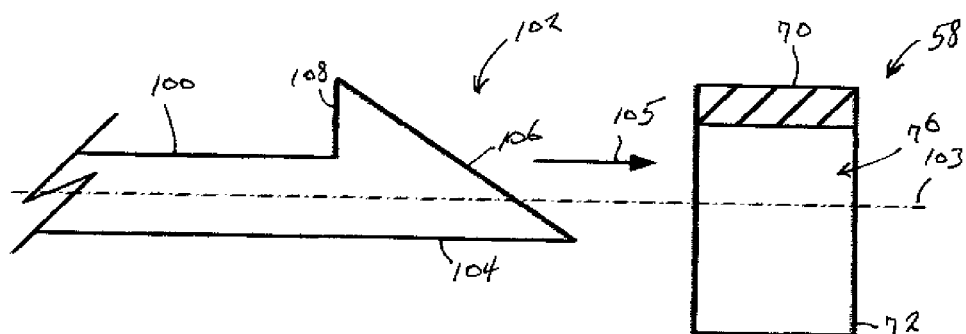
FIG. 13 is a schematic side view of a ramp structure poised for engagement with a stop portion.
Figure 14:
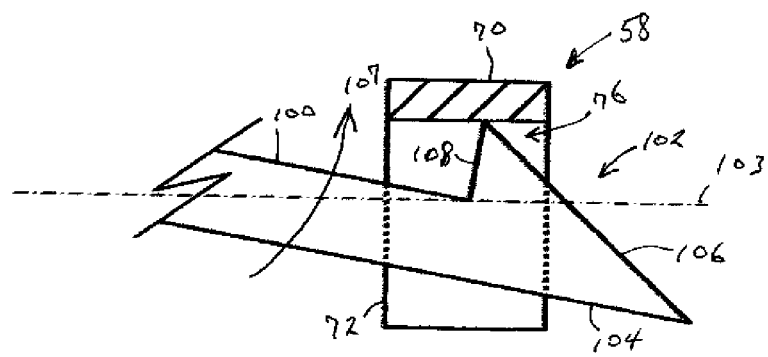
FIG. 14 is a schematic side view of a ramp structure in the process of engaging with a stop portion.
Figure 15:
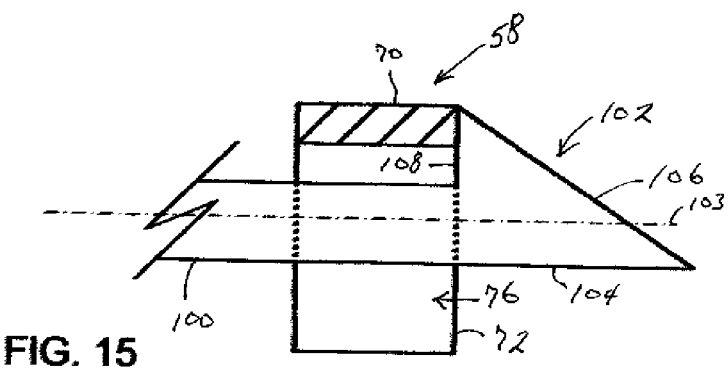
FIG. 15 is a schematic side view of a ramp structure engaged with a stop portion.

FIG. 13 is a schematic side view of a ramp structure poised for engagement with a stop portion. FIG. 14 is a schematic side view of a ramp structure in the process of engaging with a stop portion. FIG. 15 is a schematic side view of a ramp structure engaged with a stop portion. Regarding FIGS. 13-15 together, before a latching engagement operation is begun lever portion 100 and integrally formed latching portion 102 are at rest substantially symmetrically oriented about an initial axis 103. A latching engagement operation is initiated by moving one or both of latching portion 102 and stop structure 58 to displace latching portion 102 relative to stop structure 58 along an installation path, indicated by an arrow 105.

As latching portion 102 and stop structure 58 are urged together, ramp section 106 passes within channel 76 between side walls 72, 74 (only side wall 72 is shown in FIGS. 13-15) and ramp section 106 bears against top wall 70. As latching portion 102 and stop structure 58 are urged further together ramp section 106 is deflected from initial axis 103 and passes through channel 76. Deflection of ramp section 106 establishes a deflection force in lever portion 100 urging lever portion 100 in the direction indicated by arrow 107 (FIG. 14).

When the intersection between blocking section 108 and ramp section 106 passes clear of top wall 70, ramp section 106 responds to the deflection force established in lever portion 100 to return toward symmetry with axis 103 to a position in which blocking section 108 is in a substantially abutting relation with top wall 70. Blocking section 108 resists removal of latching portion 102 back along the installation path (indicated by arrow 105) without first deflecting latching portion 102 from axis 103.

Joining structures 20, 22, 24, 26 (FIG. 1) may thus be established, preferably in combination, by insertion of insertion structures 82 within receiver structures 56 and by insertion of latching insertion structures 84 within stop structures 58. It is preferred that receiver structures 56, stop structures 58, insertion structures 82 and latching insertion structures 84 each be integrally formed with a respective first member 12, 14 or a respective second member 16, 18 as appropriate to establish joint structures 20, 22, 24, 26 substantially rigidly about respective axes 30, 32, 34, 36 (FIG. 1). While any polygonal structure may be established circumscribing volume 40 (FIG. 1) using the teachings of the present invention, a preferred polygonal shape is a quadrilateral shape, and especially a rectangular shape. Maintaining a predetermined polygonal shape for a filter element contributes to reduced air leakage around the filter element when it installed in an air duct or other installation site.

Figure 16:
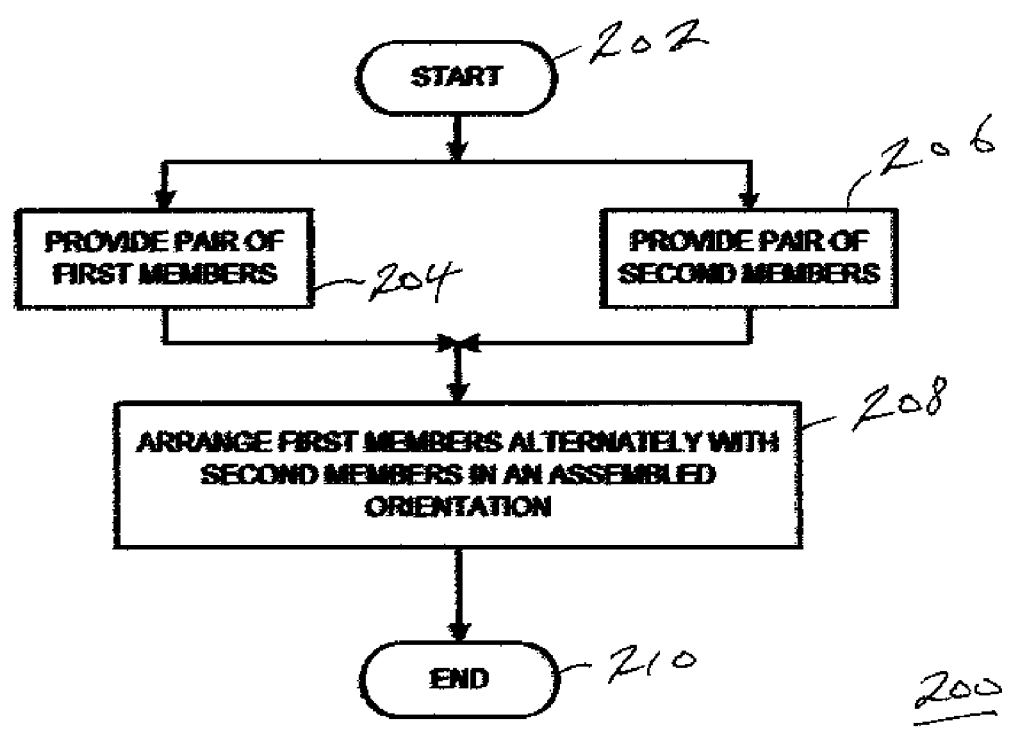
FIG. 16 is a flow chart illustrating an embodiment of the method of the invention.

FIG. 16 is a flow chart illustrating an embodiment of the method of the invention. In FIG. 16, a method 200 for providing a frame for receiving a filter element begins at a START locus 202. Method 200 continues by in no particular order: (1) providing a pair of first members, as indicated by a block 204; and (2) providing a pair of second members, as indicated by a block 206.

Method 200 continues with the step of arranging the first members alternately with the second members in an assembled orientation to establish a plurality of joining structures between adjoining the members, as indicated by a block 208. Each respective joining structure of the plurality of joining structures maintains the adjoining members oriented substantially about a respective axis. The first members and the second members cooperate to define a volume for effecting the receiving of the filter element.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A frame for receiving a filter element; the frame comprising:
   a pair of first members, each including tab members which permit said filter element to be slidingly engaged with said first member between said tab members, and at least two receiving structures; and
   a pair of second members, each including a base portion, at least one latching insertion structure extending substantially perpendicular to said base portion, and at least two insertion structures extending substantially perpendicular to said base portion;
   wherein:
      said first members being arranged alternately with said second members in an assembled orientation to establish a plurality of joining structures between adjoining said members;
      each respective joining structure maintaining said members oriented substantially about a respective axis;
      said first members and said second members cooperating to define a volume for effecting said receiving; and
      each joining structure including at least one joining element, said joining element including:
         at least one latching structure, said at least one latching structure including said at least one latching insertion structure;
         at least two guiding structures, said at least two guiding structures including said at least two receiving structures and said at least two insertion structures; and
         wherein said at least two insertion structures are slidingly receivable within said at least two receiving structures.

2. A frame for receiving a filter element as recited in claim 1 wherein each latching structure including at least two portions for effecting a latching relationship between said respective adjoining members.

3. A frame for receiving a filter element as recited in claim 2 wherein a first portion of said at least two portions is integrally formed in one of said adjoining members, and wherein a second portion of said at least two portions is integrally formed in an other of said adjoining members.

4. A frame for receiving a filter element as recited in claim 3 wherein at least one of said at least one first portion presents a ramp structure generally oriented about an initial axis, and wherein at least one said at least one second portion presents a stop portion; said ramp structure being deflected from said initial axis as said ramp structure is urged against said stop portion along an installation path; said ramp structure returning substantially to said initial orientation about said initial axis when said ramp structure is urged past said stop portion along said installation path to an installed orientation; said ramp structure bearing against said stop portion to effect resisting removal back along said installation path when said ramp structure is in said installed orientation.

* * * * *